(12) United States Patent
Li et al.

(10) Patent No.: US 9,305,372 B2
(45) Date of Patent: Apr. 5, 2016

(54) METHOD AND DEVICE FOR IMAGE PROCESSING

(75) Inventors: Zhengguo Li, Singapore (SG); Zijian Zhu, Singapore (SG); Shiqian Wu, Singapore (SG); Shoulie Xie, Singapore (SG); Susanto Rahardja, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 331 days.

(21) Appl. No.: 13/811,593

(22) PCT Filed: Jul. 26, 2011

(86) PCT No.: PCT/SG2011/000264
§ 371 (c)(1),
(2), (4) Date: Mar. 7, 2013

(87) PCT Pub. No.: WO2012/015359
PCT Pub. Date: Feb. 2, 2012

(65) Prior Publication Data
US 2013/0287296 A1 Oct. 31, 2013

Related U.S. Application Data

(60) Provisional application No. 61/367,489, filed on Jul. 26, 2010.

(51) Int. Cl.
*G06T 11/00* (2006.01)
*H04N 5/235* (2006.01)
*G06T 5/50* (2006.01)

(52) U.S. Cl.
CPC ............... *G06T 11/001* (2013.01); *G06T 5/50* (2013.01); *H04N 5/2355* (2013.01); *G06T 2207/10024* (2013.01); *G06T 2207/20208* (2013.01)

(58) Field of Classification Search
None
See application file for complete search history.

(56) References Cited

U.S. PATENT DOCUMENTS

2003/0090488 A1* 5/2003 Yoo ............................. 345/473
2003/0133035 A1 7/2003 Hatano
(Continued)

FOREIGN PATENT DOCUMENTS

CN 101170650 A 4/2008
WO 2009153836 A1 12/2009

OTHER PUBLICATIONS

International Preliminary Report on Patentability for International Application No. PCT/SG2011/000264 dated Nov. 6, 2012.
(Continued)

*Primary Examiner* — Sean Motsinger
(74) *Attorney, Agent, or Firm* — Winstead, P.C.

(57) ABSTRACT

Embodiments provide a method for processing a first image based on a second image, wherein each pixel in the first image has a plurality of color components and has a corresponding pixel in the second image, and wherein each value of a color component in the first image corresponds to a value of a color component in the second image. The method may include deciding, for each color component of a pixel in the first image, whether to modify the value of the color component dependent on a predetermined criterion. The method may further include determining a similarity index between the pixel in the first image and the corresponding pixel in the second image based on, for each color component of the pixel, the value of the color component of the pixel, or if it is decided that the value of the color component of the pixel is to be modified, the corresponding value of the color component in the second image.

15 Claims, 8 Drawing Sheets

(56) References Cited

U.S. PATENT DOCUMENTS

| | | | |
|---|---|---|---|
| 2004/0028137 A1* | 2/2004 | Wyn-Harris et al. | 375/240.17 |
| 2007/0146538 A1* | 6/2007 | Kakinuma et al. | 348/362 |
| 2008/0095408 A1 | 4/2008 | Yokohata et al. | |
| 2010/0091119 A1* | 4/2010 | Lee | 348/208.4 |
| 2010/0231748 A1* | 9/2010 | Takeda | 348/229.1 |

OTHER PUBLICATIONS

Li et al., "Robust Generation of High Dynamic Range Images," 2010 IEEE International Conference on Acoustics Speech and Signal Processing (ICASSP), Piscataway, NJ, Mar. 14, 2010, pp. 1038-1041, XP031697282, ISBN: 978-1-4244-4295-9.

Debevec et al., "Recovering High Dynamic Range Radiance Maps from Photographs," In Proceedings of SIGGRAPH 97, pp. 369-378, Aug. 1997.

Liu et al., "Synthesis of High Dynamic Range Motion Blur Free Image From Multiple Captures," IEEE Transactions on Circuits and Systems—I: Fundamental Theory and Applications, vol. 50, No. 4, pp. 530-539, Apr. 2003.

Thorsten Grosch, "Fast and Robust High Dynamic Range Image Generation with Camera and Object Movement," In Vision, Modeling and Visualization, pp. 277-284, 2006.

Li et al., "Robust Generation of High Dynamic Range Images," In 2010 IEEE International Conference on Acoustics, Speech and Signal Processing, Texas, U.S.A., pp. 1038-1041, Mar. 2010.

Jacobs et al., "Automatic High-Dynamic Range Image Generation for Dynamic Scenes," IEEE Computer Graphics and Applications, vol. 128, No. 2, pp. 84-93, Feb. 2008.

Steve Mann, "Comparametric Equations with Practical Applications in Quantigraphic Image Processing," IEEE Transactions on Image Processing, vol. 9, No. 8, pp. 1389-1406, Aug. 2000.

Grossberg et al., "Determining the Camera Response from Images: What is Knowable?" IEEE Transactions on Pattern Analysis and Machine Intelligence, vol. 25, No. 11, pp. 1455-1467, Nov. 2003.

Summary of C.W. Wyckoff, "An Experimental Extended Response Film," SPIE Newslett, pp. 16-20, Jun.-Jul. 1962.

Kang et al., "High Dynamic Range Video," ACM Transactions on Graphics, vol. 22, No. 3, pp. 319-325, Aug. 2003.

Cotsaces et al., "Video Shot Detection and Condensed Representation: A Review," IEEE Signal Processing Magazine, pp. 28-37, Mar. 2006.

Wu et al., Change Detection Using Comparagram of Images Under Varying Illumination, IET Electronics Letters, vol. 46, No. 12, pp. 832-834, Jun. 2010.

Zhu et al., "Recovering Real-World Scene: High-Quality Image Inpainting Using Multi-Exposed References," IET Electronics Letters, vol. 45, No. 25, pp. 1310-1312, Dec. 2009.

Pardo et al., "Visualization of High Dynamic Range Images," IEEE Transactions on Image Processing, vol. 12, No. 6, pp. 639-647, Jun. 2003.

Roger N. Clark, "Digital Camera Sensor Performance Summary," http://www.clarkvision.com/articles/digital.sensor.performance.summary, pp. 1-20, 2009.

Emil Martinec, "Noise, Dynamic Range and Bit Depth in Digital SLRs," http://theory.uchicago.edu/~ejm/pix/20d/tests/noise, pp. 1-6, May 22, 2008.

Meylan et al., "High Dynamic Range Image Rendering With a Retinex-Based Adaptive Filter," IEEE Transactions on Image Processing, vol. 15, No. 9, pp. 2820-2830, Sep. 2006.

Li et al., "High Dynamic Range Compression by Half Quadratic Regularization," In 2009 IEEE International Conference on Image Processing, pp. 3169-3172, Cairo, Egypt, Nov. 2009.

Fattal et al., "Gradient Domain High Dynamic Range Compression," ACM Transactions on Graphics, vol. 21, No. 3, pp. 249-256, Aug. 2002.

Mertens et al., "Exposure Fusion," In 15th Pacific Conference on Computer Graphics and Applications (PG'07), pp. 382-390, 2007.

Andreas Schomann, "Full Dynamic Range Tools Broadening the Horizon of Photography," http://www.fdrtools.com/front_e.php, pp. 1-2, 2009.

"Create Stunning Photographs of High Contrast Scenes," http://hdrsoft.com, p. 1, 2009.

Davide Anastasia, "Luminance HDR," http://qtpfsgui.sourceforge.net, pp. 1-9, 2011.

Annex A submitted on p. 13 of U.S. Appl. No. 61/367,489, filed Jul. 26, 2010, pp. 1-23, Jul. 26, 2010.

Office Action for Chinese Patent Application No. 201180046176.5 issued by State Intellectual Property Office of People's Republic of China on Sep. 25, 2015, pp. 1-22.

* cited by examiner

METHOD AND DEVICE FOR IMAGE PROCESSING

CROSS-REFERENCE TO RELATED APPLICATIONS

The present application is a U.S. National Stage Application under 35 U.S.C. §371 of International Application No. PCT/SG2011/000264, filed on Jul. 26, 2011, the complete disclosure of which is incorporated herein by reference. The present application claims the benefit of the US provisional patent application 61/367,489 filed on 26 Jul. 2010, the entire contents of which are incorporated herein by reference for all purposes.

TECHNICAL FIELD

Embodiments relate generally to signal processing. Specifically, embodiments relate to a method and a device for image processing.

BACKGROUND

Many natural scenes have wider dynamic ranges than those that can be recorded by conventional low dynamic range (LDR) imaging systems. An LDR image with small exposure time is under-exposed in the dark scene regions but captures the bright areas well. In contrast, an LDR image with large exposure time is saturated in the bright scene regions but captures the dark areas well. In other words, one LDR image is not able to represent the whole scene. A high dynamic range (HDR) image can be produced to represent the whole scene by sequentially capturing multiple differently exposed LDR images using normal cameras.

When an HDR image is synthesized for a scene by using multiple differently exposed LDR images, moving objects in the LDR images may cause ghosting artifacts in the final HDR image. This is often encountered in outdoor settings, wherein moving people, bus, clouds or trees waving, etc. may be captured as moving objects. To remove ghosting artifacts due to moving objects in the scene, the pixels of all LDR images are required to be properly classified into valid and invalid, and only valid pixels are used to generate the HDR image. Due to sensor and electronic noises as well as different exposures in the input LDR images, it is challenging to detect moving objects in the LDR images.

One approach is based on camera response functions (CRF) to remove ghosting artifacts. The predicted value for a pixel in an image can be computed by using the CRFs, the co-located pixel value in its reference image and their exposure times. The pixel is marked as valid if it is well approximated by the predicted value. Otherwise, it is marked as invalid in an error map. The schemes based on CRF are, however, sensitive to the estimate error of CRFs.

Another approach is based on the feature that local entropy is usually not changed much with respect to the exposure times. The local entropy is computed, and all pixels with local entropy variation larger than a threshold may be marked as invalid in an error map. Although the local entropy based method is not sensitive to the estimation error of CRFs, it is not suitable for a situation when two image regions share the same structure but with different intensity.

In another aspect, the invalid regions are usually patched by only using pixels from one single LDR image. Since moving objects usually belong to invalid regions, the dynamic ranges of moving objects in the synthesized HDR image are reduced when their dynamic ranges are inherently high.

It is thus desired to provide a movement detection scheme which is robust with respect to different exposures and variation among pixels caused by sensor and electronic noises, for the synthesis of an HDR image via a set of differently exposed LDR images.

It is also desired to provide a method to better preserve the dynamic range of moving objects in the synthesized HDR image.

SUMMARY

Various embodiments provide a method for processing a first image based on a second image, wherein each pixel in the first image has a plurality of color components and has a corresponding pixel in the second image, and wherein each value of a color component in the first image corresponds to a value of a color component in the second image. The method may include deciding, for each color component of a pixel in the first image, whether to modify the value of the color component dependent on a predetermined criterion. The method may further include determining a similarity index between the pixel in the first image and the corresponding pixel in the second image based on, for each color component of the pixel, the value of the color component of the pixel, or if it is decided that the value of the color component of the pixel is to be modified, the corresponding value of the color component in the second image.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DESCRIPTION

Figure 1:
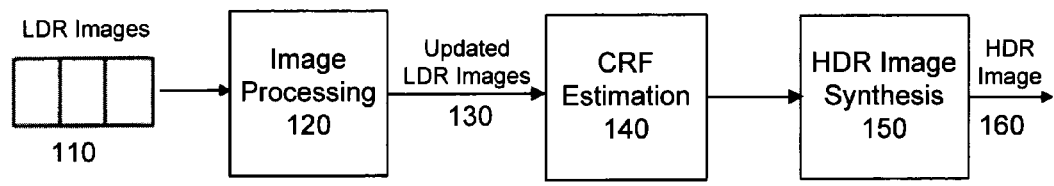
FIG. 1 shows a flow diagram for synthesis of a HDR image according to an embodiment.

Various embodiments provide a method for image processing. Various features described below in the context of the image processing method may analogously hold true for the corresponding device, and vice versa.

One embodiment is directed to a method for processing a first image based on a second image, wherein each pixel in the first image has a plurality of color components and has a corresponding pixel in the second image, and wherein each value of a color component in the first image corresponds to a value of a color component in the second image. The method may include deciding, for each color component of a pixel in the first image, whether to modify the value of the color component dependent on a predetermined criterion. The method may further include determining a similarity index between the pixel in the first image and the corresponding pixel in the second image based on, for each color component of the pixel, the value of the color component of the pixel, or if it is decided that the value of the color component of the pixel is to be modified, the corresponding value of the color component in the second image.

In an embodiment, each pixel in the first image and its corresponding pixel in the second image are co-located. The pixel in the first image and its corresponding pixel in the second image are co-located if these two pixels are at the same spatial position in the first and the second images.

In an embodiment, the first image and the second image may be part of a sequence of images with different exposure time, e.g. a sequence of low dynamic range images. The second image may also be referred to as a reference image of the first image.

In an embodiment, the plurality of color components may include a red color component, a green color component, and a blue color component. In another embodiment, the plurality of color components may include other types of color components in accordance with other color space, for example, may include a cyan color component, a magenta color component and a yellow color component if CMYK (cyan, magenta, yellow and key) color space is used.

In an embodiment, the method further includes deciding, for each color component of the corresponding pixel in the second image, whether to modify the value of the color component of the corresponding pixel dependent on a predetermined criterion, wherein each value of a color component in the second image corresponds to a value of a color component in the first image. The method may further include determining the similarity index between the pixel in the first image and the corresponding pixel in the second image based on, for each color component of the corresponding pixel, the value of the color component of the corresponding pixel, or if it is decided that the value of the color component of the corresponding pixel is to be modified, the corresponding value of the color component in the first image.

According to an embodiment, deciding whether to modify the value of the color component is dependent on the value of the color component of the pixel in the first image and the value of the color component of the corresponding pixel in the second image.

According to another embodiment, deciding whether to modify the value of the color component is dependent on a comparison of an exposure level of the color component of the pixel in the first image with an exposure level of the color component of the corresponding pixel in the second image.

In an embodiment, the exposure level of the color component of the pixel in the first image represents a deviation of the value of the color component of the pixel from a predetermined value, and the exposure level of the color component of the corresponding pixel in the second image represents a deviation of the value of the color component of the corresponding pixel from the predetermined value. The predetermined value is a middle value of a value range of the first image and the second image. For example, if the value range of the first image and the second image is [0, 255], the predetermined value may be determined to be the middle value 127.

According to an embodiment, the corresponding value of a color component in the second image is determined to correspond to the value of a color component in the first image based on an intensity mapping function from the first image to the second image, wherein the intensity mapping function is determined based on accumulated histograms of the first image and the second image. For example, the corresponding value of a color component in the second image may be determined to be a value which minimizes the difference between the accumulated histogram of the first image and the accumulated histogram of the second image.

Dependent on the determined similarity index, the pixel of the first image may be determined to be within or out of a moving object region.

Another embodiment is directed to a device for processing a first image based on a second image, wherein each pixel in the first image has a plurality of color components and has a corresponding pixel in the second image, and wherein each value of a color component in the first image corresponds to a value of a color component in the second image. The device may include a decider configured to decide, for each color component of a pixel in the first image, whether to modify the value of the color component dependent on a predetermined criterion. The device may further include a similarity index determiner configured to determine a similarity index between the pixel in the first image and the corresponding pixel in the second image based on, for each color component of the pixel, the value of the color component of the pixel, or if it is decided that the value of the color component of the pixel is to be modified, the corresponding value of the color component in the second image.

Another embodiment is directed to a method for processing a first image based on a second image, wherein the first image and the second image are part of a sequence of images captured with different exposure time. The method may include determining a similarity index between a pixel of the first image and a corresponding pixel of the second image, wherein the similarity index represents a degree of similarity between the pixel and the corresponding pixel. The method may include determining a threshold for the pixel dependent on at least one of exposure time of the first image, exposure time of the second image, a film speed for capturing the sequence of images, and an average exposure value of the sequence of images. The method may further include determining the pixel to be within or out of a moving object region dependent on a comparison of the determined similarity index with the determined threshold.

In an embodiment, the threshold for the pixel is determined dependent on an intensity value of the pixel in the first image and an intensity value of the corresponding pixel in the second image.

In another embodiment, the threshold for the pixel is determined dependent on an exposure level of the pixel in the first image and an exposure level of the corresponding pixel in the second image. The exposure level of the pixel in the first image may represent a deviation of the intensity value of the pixel from a predetermined value, and the exposure level of the corresponding pixel in the second image may represent a deviation of the intensity value of the corresponding pixel from the predetermined value. The predetermined value is a middle value of an intensity value range of the first image and the second image.

In an embodiment, determining the similarity index between the pixel of the first image and the corresponding pixel of the second image may include deciding, for each color component of the pixel in the first image, whether to modify the value of the color component dependent on a predetermined criterion, wherein each value of a color component in the first image corresponds to a value of a color component in the second image. The determination of the similarity index may further include determining the similarity index between the pixel in the first image and the corresponding pixel in the second image based on, for each color component of the pixel, the value of the color component of the pixel, or if it is decided that the value of the color component of the pixel is to be modified, the corresponding value of the color component in the second image.

Another embodiment is directed to a device for processing a first image based on a second image, wherein the first image and the second image are part of a sequence of images captured with different exposure time. The device may include a similarity index determiner configured to determine a similarity index between a pixel of the first image and a corresponding pixel of the second image, wherein the similarity index represents a degree of similarity between the pixel and the corresponding pixel. The device may further include a threshold determiner configured to determine a threshold for the pixel dependent on at least one of exposure time of the first image, exposure time of the second image, a film speed for capturing the sequence of images, and an average exposure value of the sequence of images. The device may further include a moving object region determiner configured to determine the pixel to be within or out of a moving object region dependent on a comparison of the determined similarity index with the determined threshold.

A further embodiment of the invention is directed to a method for processing a first image based on a second image, wherein the first image and the second image are part of a sequence of images captured with different exposure time. The method may include determining a similarity index between a pixel of the first image and a corresponding pixel of the second image, wherein the similarity index represents a degree of similarity between the pixel and the corresponding pixel. The method may further include determining a threshold for the pixel; and determining the pixel to be within or out of a moving object region dependent on a comparison of the determined similarity index with the determined threshold. If the pixel is determined to be within the moving object region, the method include determining a corresponding intensity value in the first image corresponding to an intensity value of the corresponding pixel in the second image or in a third image of the sequence of images based on an intensity mapping function from the second image to the first image, wherein the intensity mapping function is determined based on accumulated histograms of the first image and the second or the third image. The method further include determining an updated intensity value of the pixel in the first image to be the determined corresponding intensity value in the first image.

In one embodiment, if the pixel is determined to be within the moving object region, the corresponding intensity value in the first image may be determined based on the intensity mapping function from the second image to the first image. In other words, the intensity value of the corresponding pixel in the second image is mapped to the first image to determine the corresponding intensity value in the first image.

In another embodiment, if the pixel is determined to be within the moving object region, the method may further include determining whether the corresponding pixel of the second image and the corresponding pixel of the third image is similar. The corresponding pixels of the second image and the third image may be similar if their intensity values are similar. If the corresponding pixel of the second image is not similar to the corresponding pixel of the third image, the corresponding intensity value in the first image may be determined based on the intensity mapping function from the second image to the first image. In other words, the intensity value of the corresponding pixel in the second image is mapped to the first image to determine the corresponding intensity value in the first image.

If the corresponding pixel of the second image is similar to the corresponding pixel of the third image, the corresponding intensity value in the first image may be determined based on the intensity mapping function from the third image to the first image. In other words, the intensity value of the corresponding pixel in the third image is mapped to the first image to determine the corresponding intensity value in the first image.

According to an embodiment, the intensity mapping function may include minimizing a difference between the accumulated histogram of the first image and the accumulated histogram of the second image. The accumulated histogram of the first image may represent a number of pixels in the first image having an intensity value equal to or less than an intensity value to be determined, i.e. the corresponding intensity value in the first image. The accumulated histogram of the second image may represent a number of pixels in the second image having an intensity value equal to or less than the intensity value of the corresponding pixel in the second image. The accumulated histogram of the third image may represent a number of pixels in the third image having an intensity value equal to or less than the intensity value of the corresponding pixel in the third image.

In an embodiment, the intensity mapping function may be an arg min function, such that the corresponding intensity value in the first image is determined to be a value which minimizes the difference between the accumulated histogram of the second image (or the third image) up to the intensity value of the corresponding pixel in the second image (or the third image) and the accumulated histogram of the first image up to the corresponding intensity value in the first image.

In an embodiment, the method may further include applying an average filter to the determined corresponding intensity value using a plurality of neighboring pixels, wherein intensity values of the plurality of neighboring pixels have been processed and updated according to the method above.

According to an embodiment, if the pixel is determined to be out of the moving object region, the updated intensity value of the pixel is determined to be the intensity value of the pixel.

In the above embodiments, the corresponding intensity value in the first image and the updated intensity value of the pixel may be determined for each color component of the pixel separately.

A further embodiment is directed to a device for processing a first image based on a second image, wherein the first image and the second image are part of a sequence of images captured with different exposure time. The device include a similarity index determiner configured to determine a similarity index between a pixel of the first image and a corresponding pixel of the second image, wherein the similarity index represents a degree of similarity between the pixel and the corresponding pixel. The device may further include a threshold determiner configured to determine a threshold for the pixel, and a moving object region determiner configured to determine the pixel to be within or out of a moving object region dependent on a comparison of the determined similarity index with the determined threshold. The device may further include a corresponding intensity value determiner configured to determine a corresponding intensity value in the first image corresponding to an intensity value of the corresponding pixel in the second image based on an intensity mapping function from the second image to the first image, if the pixel is determined to be within the moving object region, wherein the intensity mapping function is determined based on accumulated histograms of the first image and the second image. The device may further include an updater configured to determine an updated intensity value of the pixel in the first image to be the determined corresponding intensity value in the first image.

In this context, the various image processing devices as described in the embodiments may include a memory which is for example used in the processing carried out by the image processing devices. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In this context, the image processing devices as described in this description may be or may include an image processing circuit.

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

FIG. 1 shows a flow diagram for synthesis of a HDR image according to an embodiment.

A sequence of images 110, e.g. LDR images, with different exposure time is received as input images. The LDR images 110 may include moving objects.

The sequence of LDR images 110 may be processed at 120. For example, the processing of the LDR images 110 may include detecting moving objects in the LRD images 110, removing the moving objects in the LDR images 110, and generating updated LDR images 130. Various embodiments of the image processing method at 120 will be described in more detail below.

Based on the updated LDR images 130, a camera response function is estimated at 140.

Based on the updated LDR images 130 and the estimated camera response function, an HDR image 160 is synthesized at 150.

Figure 2:
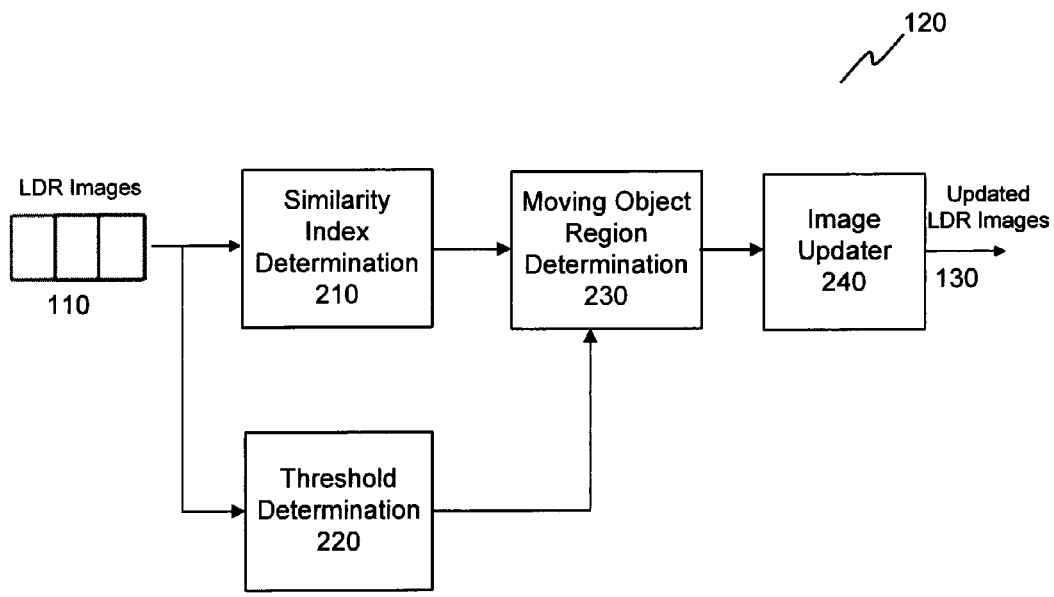
FIG. 2 shows a flow diagram for image processing according to various embodiments.

FIG. 2 shows a flow diagram for image processing according to various embodiments.

The image processing 120 in FIG. 1 may be performed in accordance with various embodiments described in FIG. 2, in order to process the LDR images to remove moving objects and to use the processed LDR images to synthesize the HDR image.

A sequence of LDR images 110 with different exposure time is received as input images. The sequence of LDR images 110 may be processed in a predetermined order, such that each time one LDR image (also referred to as a first image) is processed based on another LDR image (also referred to as a second image) selected as its reference image. The processing order of the sequence of LDR images 110 according to an embodiment is illustrated in FIG. 3.

Figure 3:
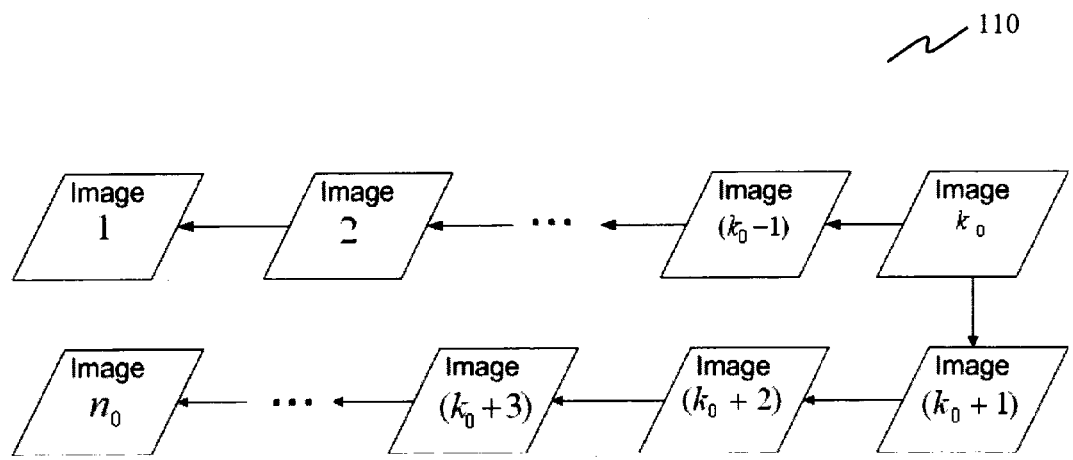
FIG. 3 shows the processing order of a sequence of images according to an embodiment.

According to the embodiment in FIG. 3, a sequence of images 110 indexed by $1, 2, \ldots, k_0-1, k_0, k_0+1, \ldots, n_0$ is received as input images. A middle image denoted as $Z_{k_0}$ may be selected as an initial reference image. All pixels in the initial reference image $Z_{k_0}$ are marked as valid. Since the correlations between neighboring images are the strongest, the initial reference image $Z_{k_0}$ may be selected as the reference image for the image $Z_{k_0-1}$ and also for the image $Z_{k_0+1}$. Accordingly, a pixel at location p, $Z_{k_0}(p)$, in the reference image $Z_{k_0}$ may be used to determine whether the co-located pixels $Z_{k_0-1}(p)$ and $Z_{k_0+1}(p)$ in the images $Z_{k_0-1}$ and $Z_{k_0+1}$ are valid, i.e. within or out of a moving objection region, based on the similarity between the reference pixel $Z_{k_0}(p)$ and the respective co-located pixels $Z_{k_0-1}(p)$ and $Z_{k_0+1}(p)$. The intensity values of invalid pixels in the images $Z_{k_0-1}(p)$ and $Z_{k_0+1}(p)$ may be corrected or updated to obtain an updated image $Z_{k_0-1}(p)_{update}$ and an updated image $Z_{k_0+1}(p)_{update}$, in which the moving object is removed. The pixel $Z_{k_0}(p)$ in the initial reference image $Z_{k_0}$ may also be applied to detect whether pixels $Z_k(p)(|k-k_0|>1)$ in other images is valid.

In another embodiment, as correlation between images $Z_{k_0}$ and $Z_k$ becomes weaker when the value of $|k-k_0|$ is greater than 1, the reference image for each image to be processed is updated progressively. For example, after the image $Z_{k_0-1}$ is processed based on the initial reference image $Z_{k_0}$ to obtain the updated image $Z_{k_0-1}(p)_{update}$, the updated image $Z_{k_0-1}(p)_{update}$ is used as the reference image for the next image $Z_{k_0-2}$ for the processing of the image $Z_{k_0-2}$.

According to an embodiment, the sequence of images may be processed in the order of $Z_{k_0-1}, Z_{k_0-2}, \ldots, Z_1, Z_{k_0+1}, Z_{k_0+2}, \ldots, Z_{n_0}$ as demonstrated in FIG. 3.

For simplicity, for an image $Z_k$ to be processed, its reference image is denoted as $Z_{k'}$. The value of k' corresponds to the exposure time $\Delta t_k$ of image $Z_{k'}$ and its value is updated as $$k' = \begin{cases} k+1; & \text{if } k < k_0 \\ k-1; & \text{if } k > k_0. \end{cases}$$

In this context, the reference image denoted by $Z_{k'}$ has been updated or processed to remove the moving object in the original image indexed by k'. If $k'=k_0$, $Z_{k'}=Z_{k_0}$.

A pixel in an image $Z_k(k \neq k_0)$ is marked as valid if it is similar to the co-located pixel in its reference image $Z_{k'}$, and is marked as invalid otherwise.

When moving objects exist in the images $Z_k(1 \leq k \leq n_0)$, there may be ghosting artifacts in the final HDR image if images $Z_k(1 \leq k \leq n_0)$ are directly adopted to synthesize the final HDR image. To remove ghosting artifacts from the final HDR image, it is necessary to detect moving objects in images $Z_k(1 \leq k \leq n_0)$. In the following, the similarity determination between an image and its reference image, the similarity threshold determination, the moving object region determination, and the image updating according to various embodiments are described in detail. For simplicity, these embodiments are described in the context of a first image $Z_k$ and a second image $Z_{k'}$, and it is understood that the various embodiments may be applied to all the images in the sequence 110 in the order illustrated in FIG. 3 to obtain an updated or processed sequence of images.

Let $Z_k(p)=[Z_{k,1}(p), Z_{k,2}(p), Z_{k,3}(p)]^T$ denote the image intensity vector of the position p in image $Z_k$, wherein $Z_{k,l}(p)$ represents the intensity value of a color component l, for example, for one of RGB (red, green, blue) color components or one of CMYK (cyan, magenta, yellow and key) color components. p represents a spatial position in the image $Z_k$, $k(1 \leq k \leq n_0)$ indexes LDR images with different exposures and indexes over exposure time $\Delta t_k$, and $n_0$ is the total number of input LDR images. These differently exposed LDR images may be referred to as a Wyckoff set of images, from which a HDR image may be generated. Let $E_k(p)=[E_{k,1}(p), E_{k,2}(p), E_{k,3}(p)]^T$ denote the irradiance vector corresponding to $Z_k(p)$. The relationship between $E_k(p)$ and $Z_k(p)$ is given as $$Z_k(p)=f(E_k(p)\Delta t_k+\eta_{q,k}(p))+\eta_{f,k}(p), \quad (1)$$

wherein $f(\cdot)(=[f_1(\cdot), f_2(\cdot), f_3(\cdot)]^T)$ represents the camera response function (CRF) vector, $\eta_{q,k}(p)(=[\eta_{q,k,1}(p), \eta_{q,k,2}(p), \eta_{q,k,3}(p)]^T)$ represents sensor noise vector, and $\eta_{f,k}(p)(=[\eta_{f,k,1}(p), \eta_{f,k,2}(p), \eta_{f,k,3}(p)]^T)$ represents electronics noise vector. $f_l(\cdot)$ is monotonically increasing and its inverse function is denoted as $f_l^{-1}(\cdot)$, wherein l indexes the color component.

If there is no moving object in the scene and all LDR images are well aligned, equation (1) may become:

$$Z_k(p)=f(E(p)\Delta t_k+\eta_{q,k}(p))+\eta_{f,k}(p). \quad (2)$$

One feature of differently exposed LDR images $Z_k$ and $Z_{k'}$ is that there is possibly large intensity change between two co-located pixels $Z_k(p)$ and $Z_{k'}(p)$ due to different exposures.

Consider two pixels $Z_k(p)$ and $Z_k(p')$ with the same color component value of $Z_{k,l}(p)$ and $Z_{k,l}(p')$. The other feature of differently exposed images is that there is possibly large variation between the values of $Z_{k',l}(p)$ and $Z_{k',l}(p')$ in the reference image due to the sensor and electronic noises. It is shown from Equation (1) that the values of $Z_{k',l}(p)$ and $Z_{k',l}(p')$ are the same in the ideal case that there is neither sensor noise nor electronic noise. However, the values of $\eta_{q,k,l}(p)$, $\eta_{f,k,l}(p')$, $\eta_{q,k',l}(p)$ and $\eta_{f,k',l}(p')$ are usually not zeros. There is variation between the values of $Z_{k',l}(p)$ and $Z_{k',l}(p')$ caused by the sensor noise. The variation could be large in the presence of the electronic noise, especially when $Z_{k,l}(p)$ and $Z_{k,l}(p')$ are saturated or under-exposed.

At 210, a similarity index for differently exposed LDR images is determined according to various embodiments. The similarity index is determined based on an intensity mapping function (IMF), taking the above two features of differently exposed LDR images into consideration.

Since there is possible large intensity change between two co-located pixels $Z_k(p)$ and $Z_{k'}(p)$ in the first image $Z_k$ and the second image $Z_{k'}$, the original intensity values $Z_k(p)$ and $Z_{k'}(p)$ may not be directly used to determine the similarity index. According to an embodiment, a decision may be performed to determine whether the intensity values of the pixels $Z_k(p)$ and $Z_{k'}(p)$ need to be modified dependent on a predetermined criterion, so as to obtain a pair of updated pixels $\check{Z}_k(p)$ and $\check{Z}_{k'}(p)$. The similarity index for the pixels p is determined based on the updated intensity values $\check{Z}_k(p)$ and $\check{Z}_{k'}(p)$.

According to an embodiment, the decision may be performed for each color component $Z_{k,l}(p)$ and $Z_{k',l}(p)$ of the pixels $Z_k(p)$ and $Z_{k'}(p)$. In an embodiment, the decision is performed dependent on the values of the color component $Z_{k,l}(p)$ and $Z_{k',l}(p)$. In another embodiment, the decision is performed dependent on the exposure level of the color component $Z_{k,l}(p)$ and the exposure level of the color component $Z_{k',l}(p)$.

According to an embodiment, the updated pair of pixels $\check{Z}_k(p)$ and $\check{Z}_{k'}(p)$ are generated by using a bi-directional mapping method as $$\check{Z}_{k,l}(p) = \begin{cases} Z_{k,l}(p); & \text{if } w(Z_{k,l}(p)) \leq w(Z_{k',l}(p)) \\ \Lambda_{k,k',l}(Z_{k,l}(p)); & \text{otherwise,} \end{cases} \quad (3)$$

$$\check{Z}_{k',l}(p) = \begin{cases} \Lambda_{k',k,l}(Z_{k',l}(p)); & \text{if } w(Z_{k,l}(p)) \leq w(Z_{k',l}(p)) \\ Z_{k',l}(p); & \text{otherwise,} \end{cases}$$

wherein $\omega(z)$ represents the exposure level of a pixel determined based on the intensity value z of the pixel, and $\Lambda(z)$ represents an intensity mapping function as described in detail below. $\omega(z)$ may be determined in accordance with the following equation:

$$w(z) = \begin{cases} (z+1)/128; & \text{if } z \leq 127 \\ (256-z)/128; & \text{otherwise.} \end{cases} \quad (4)$$

In the above embodiment, the exposure level $\omega(z)$ represents a deviation of the intensity value z from a predetermined value 127. The predetermined value is a middle value 127 of a value range [0, 255] in the above example of equation (4). In another embodiment wherein the intensity value of the first image and the second image is in a range of [0, 65535], the predetermined value may be determined to be 32767. In other embodiments wherein the first image and the second image are 32-bit or 64 bit images, the predetermined value may be determined to be the middle value of the intensity range accordingly.

In equation (3), $\Lambda_{k,k'}(z)$ represents a corresponding value in the reference image $Z_{k'}$ determined by mapping the intensity value z in the image $Z_k$ to the reference image $Z_{k'}$ based on an intensity mapping function (IMF), and may be referred to as a forward IMF. Similarly, $\Lambda_{k',k}(z)$ represents a corresponding value in the image $Z_k$ determined by mapping the intensity value z in the reference image $Z_{k'}$ to the image $Z_k$ based on an intensity mapping function, and may be referred to as a backward IMF. $\Lambda_{k,k'}(z)$ may be represented in the form of an IMF vector as $\Lambda_{k,k'}(z)(=[\Lambda_{k,k',1}(z), \Lambda_{k,k',2}(z), \Lambda_{k,k',3}(z)]^T)$, and $\Lambda_{k',k}(z)$ may be represented as an IMF vector $\Lambda_{k',k}(z)(=[\Lambda_{k',k,1}(z), \Lambda_{k',k,2}(z), \Lambda_{k',k,3}(z)]^T)$, in which the corresponding values $\Lambda_{k,k',l}(z)$ and $\Lambda_{k',k,l}(z)$ of each color component l is determined.

According to an embodiment, the corresponding values $\Lambda_{k,k'}(z)$ and $\Lambda_{k',k}(z)$ may be determined based on a respective intensity mapping function, wherein the intensity mapping function is determined based on accumulated histograms $H_k(z)$ and $H_{k'}(z)$ of the images $Z_k$ and $Z_{k'}$. The accumulated histogram $H_k(z)$ represents the cardinality of a set including all the pixels of the image $Z_k$ having an intensity value not larger than z, and $H_{k'}(z)$ may be similarly determined.

In an embodiment, for the value z of a color component in the image $Z_k$, the corresponding value $\Lambda_{k,k'}(z)$ may be determined by finding an intensity value m which minimize the difference between $H_k(z)$ and $H_k(m)$. In an exemplary embodiment, the corresponding value $\Lambda_{k,k',l}(z)$ may be determined in accordance with the equation below:

$$\Lambda_{k,k',l}(z) = \arg\min_{m \in [\Lambda_{k,k',l}(z-1), 255]} \{|H_{k,l}(z) - H_{k',l}(m)|\}, \quad (5)$$

$$H_{k,l}(z) = \sum_{n=0}^{z} |\Theta_k(n)|, \quad (6)$$

$$\Theta_k(z) = \{(i,j) \mid Z_{k,l}(i,j) = z\}$$

wherein $|\Theta_k(z)|$ is the cardinality of the set $\Theta_k(z)$, and represents the number of pixels in image $Z_k$ with the value of $Z_{k,l}(p)$ being equal to or less than z. $\Lambda_{k,k',l}(0)=0$, and $\Lambda_{k,k',l}(z)$ is a monotonic increasing function of z.

The corresponding value $\Lambda_{k',k}(z)$ for the value z of a color component in the reference image $Z_{k'}$ may be determined analogously.

The determination of the corresponding values $\Lambda_{k,k',l}(z)$ and $\Lambda_{k,k',l}(z)$ using the intensity mapping function according to equations (5) and (6) above does not require estimation of a camera response function, and thereby is robust to the estimation error of the camera response function.

According to the embodiments and equations (3)-(6) above, depending on a comparison of the exposure level of the color component $Z_{k,l}(p)$ with the exposure level of the color component $Z_{k',l}(p)$, it is decided whether the value of the color component of the pixel $Z_{k,l}(p)$ is to be modified. If yes, the updated value $\check{Z}_k(p)$ is determined to be the corresponding value $\Lambda_{k,k',l}(z)$. If not, the updated value $\check{Z}_k(p)$ is identical to the original value $Z_{k,l}(p)$ of the pixel. The same decision process is performed to determine the updated value $\check{Z}_{k'}(p)$ for the corresponding pixel in the reference image $Z_{k'}$. Since the updated value $\check{Z}_k(p)$ and $\check{Z}_{k'}(p)$ can be determined using a more reliable value from either the original image or the reference image, the determination of the updated value is referred to as a bi-directional mapping method.

The updated values $\check{Z}_k(p)$ and $\check{Z}_{k'}(p)$ may be used to determine the similarity index at 210. In an embodiment, the similarity index $S(Z_k(p), Z_{k'}(p))$ may be determined in accordance with the following equation:

$$S(Z_k(p), Z_{k'}(p)) = \frac{2\sum_{l=1}^{3} \check{Z}_{k,l}(p)\check{Z}_{k',l}(p) + 1}{\sum_{l=1}^{3} \left[\check{Z}_{k,l}^2(p) + \check{Z}_{k',l}^2(p)\right] + 1}. \quad (7)$$

According to equation (7), the value of $S(Z_k(p), Z_{k'}(p))$ is 1 when $\check{Z}_{k,l}(p)$ and $\check{Z}_{k',l}(p)$ are the same for each color component l. The more similar these two updated values $\check{Z}_k(p)$ and $\check{Z}_{k'}(p)$, the closer the value of $S(Z_k(p), Z_{k'}(p))$ to 1.

In another embodiment, the similarity index $S_l(Z_k(p), Z_{k'}(p))$ for each color component l may be determined in accordance with the following equation:

$$S_l(Z_k(p), Z_{k'}(p)) = \frac{2\check{Z}_{k,l}(p)\check{Z}_{k',l}(p) + 1}{\check{Z}_{k,l}^2(p) + \check{Z}_{k',l}^2(p) + 1}$$

Based on the IMF vectors $\Lambda_{k,k'}(z)$ and $\Lambda_{k',k}(z)$ and the bi-directional mapping approach, the robustness of the similarity index of the various embodiments, e.g. in accordance with equation (7), may be significantly improved.

The updated values $\check{Z}_k(p)$ and $\check{Z}_{k'}(p)$ determined using $\Lambda_{k,k'}(z)$ and $\Lambda_{k',k}(z)$ may unify the intensity values of $Z_k(p)$ and $Z_{k'}(p)$ before the determination of the similarity index.

Table 1 shows the intensity difference between original intensity values $Z_k(p)$ and $Z_{k'}(p)$ and between the updated intensity values $\check{Z}_k(p)$ and $\check{Z}_{k'}(p)$. The LDR image sequence shown in FIG. 5 and the first five images in FIG. 7 below are used to calculate $$\sum_p \frac{Z_{k,l}(p) + 1}{Z_{k',l}(p) + 1} \text{ and}$$

$$\sum_p \frac{\check{Z}_{k,l}(p) + 1}{\check{Z}_{k',l}(p) + 1}.$$

As shown in Table 1, the value of $$\sum_p \frac{Z_{k,1}(p) + 1}{Z_{k',1}(p) + 1}$$

shows a large intensity change between $Z_k(p)$ and $Z_{k'}(p)$ of two differently exposed images.

Based on the updated intensity values $\check{Z}_k(p)$ and $\check{Z}_{k'}(p)$ determined using the IMF vectors $\Lambda_{k,k'}(z)$ and $\Lambda_{k',k}(z)$, the intensities of the pixels in the two images are unified. Thus, the robustness of the similarity index of the various embodiments with respect to intensity changes between images $Z_k$ and $Z_{k'}$ due to different exposure times are improved. The IMF vectors can also be used to smooth the variation caused by the sensor noise. Therefore, the robustness of the similarity index of various embodiments with respect to the sensor noise is also improved. Meanwhile, a bi-directional mapping approach according to equation (3) is provided to improve the robustness of the similarity index with respect to the electronic noise.

In an illustrative example of a pair of pixels $Z_k(p)$ and $Z_{k'}(p)$, $Z_{k,1}(p)$ and $Z_{k,2}(p)$ are well exposed but $Z_{k,3}(p)$ is saturated. $Z_{k',1}(p)$ and $Z_{k',2}(p)$ are under-exposed but $Z_{k',3}(p)$ is well exposed. By using the proposed bi-directional mapping approach according to equations (3) and (4) above, pixels $\check{Z}_k(p)$ and $\check{Z}_{k'}(p)$ are determined to be $[\Lambda_{k,k',1}(Z_{k,1}(p)), \Lambda_{k,k',2}(Z_{k,2}(p)), Z_{k,3}(p)]^T$ and $[Z_{k',1}(p), Z_{k',2}(p), \Lambda_{k',k,3}(Z_{k',k,3}(p))]^T$, respectively. Accordingly, a more accurate similarity index is determined using $\check{Z}_k(p)$ and $\check{Z}_{k'}(p)$ in which each color component of the pair of pixels are evaluated, compared to using three pairs of $(Z_k(p), Z_{k'}(p)), (Z_k(p), \Lambda_{k',k}(Z_{k'}(p)))$ and $(\Lambda_{k,k'}(Z_k(p)), Z_{k'}(p))$ in which the pair of pixels are evaluated at pixel level without considering each color component.

TABLE 1

Comparison of $\sum_p \frac{Z_{k,1}(p)+1}{Z_{k',1}(p)+1}$ and $\sum_p \frac{\check{Z}_{k,1}(p)+1}{\check{Z}_{k',1}(p)+1}$

Figure 5:
FIG. 5 shows an image sequence with five different exposure time.
Figure 7:
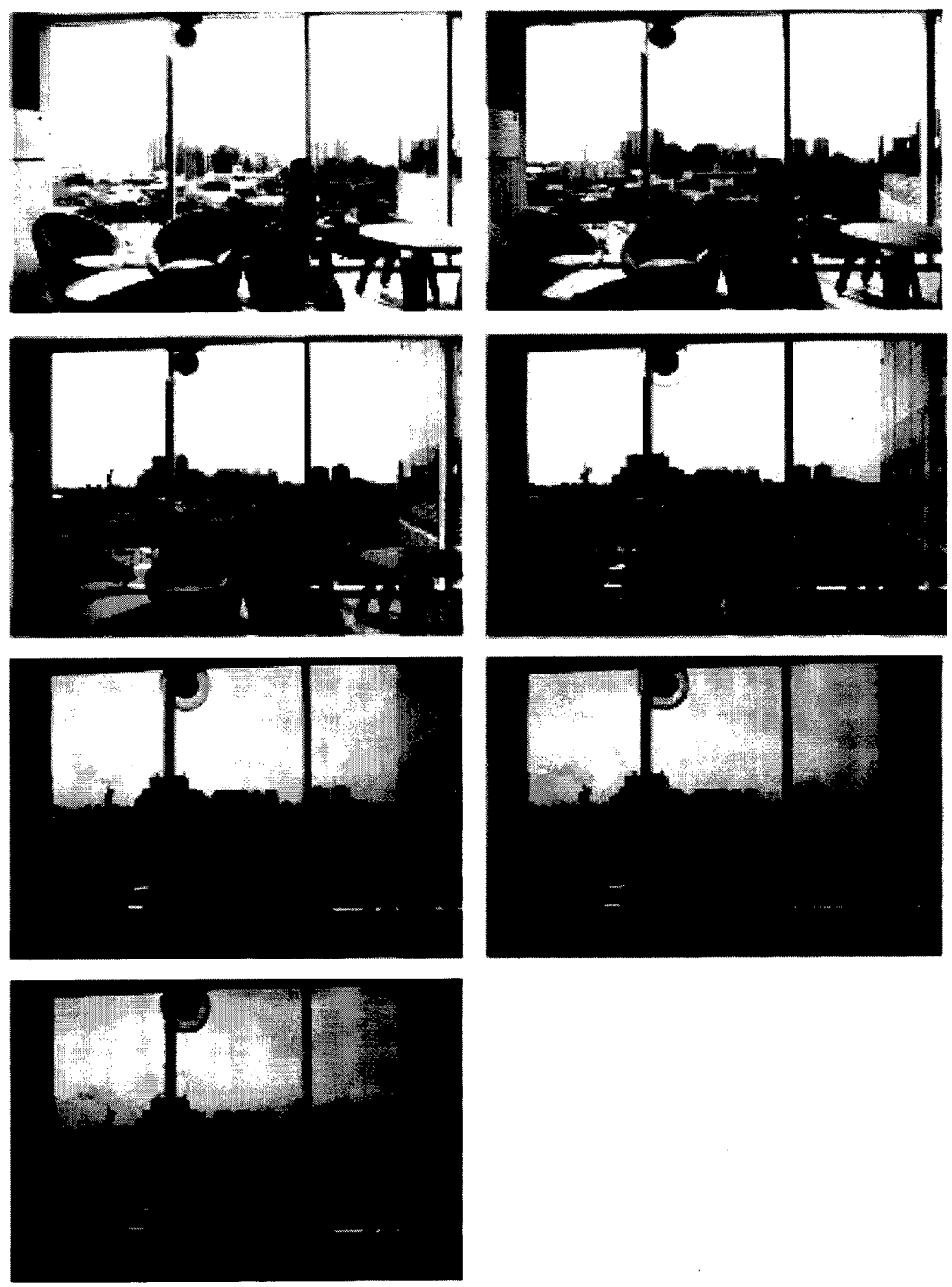
FIG. 7 shows an image sequence with seven different exposure time.

| Image sequence | $\frac{\Delta t_k}{\Delta t_{k'}}$ | $\sum_p \frac{Z_{k,1}(p)+1}{Z_{k',1}(p)+1}$ | $\sum_p \frac{\check{Z}_{k,1}(p)+1}{\check{Z}_{k',1}(p)+1}$ |
|---|---|---|---|
| In FIG. 5 | 2 | 1.5586 | 1.1127 |
|  | 4 | 2.7178 | 1.2499 |
|  | 8 | 4.3744 | 1.2107 |
|  | 16 | 7.1194 | 1.1671 |
| In FIG. 7 | 1.5 | 1.1471 | 1.0107 |
|  | $1.5^2$ | 1.4592 | 1.0333 |
|  | $1.5^3$ | 2.043 | 1.1229 |
|  | $1.5^4$ | 3.4392 | 1.3636 |

The determined similarity index $S(Z_k(p), Z_{k'}(p))$ at 210 may be used to detect moving objects in a set of differently exposed LDR images for HDR imaging.

At 220, a threshold for a pixel in the image $Z_k$ is determined using the LDR images 110. The threshold may be used to determined whether the pixel is valid or invalid, in other words, whether the pixel is within or out of a moving object region.

According to an embodiment, the threshold for the pixel is determined dependent on at least one of exposure time of the first image, exposure time of the second image, a film speed for capturing the sequence of images, and an average exposure value of the sequence of images. In another embodiment, the threshold for the pixel is also determined dependent on the exposure level of the pixel.

According to one embodiment, the threshold is determined based on the values of $Z_{k,l}(p)$, $Z_{k',l}(p)$, exposure time $\Delta t_k$ of the image $Z_k$ and exposure time $\Delta t_{k'}$ of the reference image $Z_{k'}$ in accordance with the equation blow $$Thr_{k,k'}(p) = \frac{2(1-\xi_{k,k'}(p))}{1+(1-\xi_{k,k'}(p))^2} \quad (8)$$

wherein in one embodiment $$\xi_{k,k'}(p) = \frac{15}{16} - \max\{\varepsilon(\bar{Z}_{k,l}(p)), \varepsilon(\bar{Z}_{k',l}(p))\}\rho(k,k')$$

$$\varepsilon(z) = \begin{cases} \frac{1}{128}\left(1-\frac{2z}{255}\right)^{(\frac{z}{17})^{16}}; & \text{if } z > 127 \\ \frac{1}{16}\left(1-\frac{2z}{255}\right)^{(50-\frac{10z}{51})^{16}}; & \text{otherwise} \end{cases}$$

$$\rho(k,k') = \sqrt{\frac{\max(\Delta t_k, \Delta t_{k'})}{\min(\Delta t_k, \Delta t_{k'})}}$$

wherein a threshold for each color component l is determined.

In another embodiment $$\xi_{k,k'}(p) = \max_{1\le l\le 3}\{\alpha_1 + \max\{\varepsilon(\bar{Z}_{k,l}(p)), \varepsilon(\bar{Z}_{k',l}(p))\}\rho(k,k')\}$$

$$\varepsilon(z) = \begin{cases} \alpha_2\left(1-\frac{2z}{255}\right)^{(\frac{13z}{255})^{16}}; & \text{if } z > 127 \\ \alpha_3\left(1-\frac{2z}{255}\right)^{(50-\frac{10z}{51})^{16}}; & \text{otherwise} \end{cases}$$

$$\rho(k,k') = \sqrt{\frac{\max\{\Delta t_k, \Delta t_{k'}\}}{\min\{\Delta t_k, \Delta t_{k'}\}}}.$$

wherein $\varepsilon(z)$ represents the exposure level determined based on the intensity value z. $\alpha_i(i=1,2,3)$ are three constants, which may be selected as 1/8, 1/64 and 1/4, respectively. In other embodiments, the value of $\alpha_i(i=1,2,3)$ may be selected as other suitable values. For example, when there is overlapping between the same moving object in images with different exposure times or when the background and the moving object are similar, the value of $\alpha_i(i=1,2,3)$ may be selected as 1/16, 1/128 and 1/16, respectively. In this embodiment, a threshold is determined at the pixel level.

According to another embodiment, the threshold may be determined based on the values of $Z_{k,l}(p)$, $Z_{k',l}(p)$, exposure time $\Delta t_k$ of the image $Z_k$, exposure time $\Delta t_{k'}$ of the reference image $Z_{k'}$, a value $\upsilon$ representing a film speed for capturing the sequence of images, and an average exposure value $\overline{EV}$ of the sequence of images, in accordance with the equation (8) above. In this embodiment, $$\xi_{k,k'}(p) = \left(\alpha_1 + \max_{1\le l\le 3}\{\varepsilon(\bar{Z}_{k,l}(p)), \varepsilon(\bar{Z}_{k',l}(p))\}\right) h\left(\frac{\Delta t_a^M}{\Delta t_{k,k}^M}, \frac{\Delta t_{k,k'}^M}{\Delta t_{k,k'}^m}, \overline{EV}, v\right) \quad (9)$$

$$\varepsilon(z) = \begin{cases} 0; & \text{if } z > 127 \\ \alpha_2\left(1-\frac{2z}{255}\right)^{(50-\frac{10z}{51})^{16}}; & \text{otherwise.} \end{cases}$$

$$h(x_1, x_2, x_3, x_4) = \begin{cases} \frac{10(x_1 x_4)^{1/8}}{(10\log_2(x_2))^{1/4}|x_3|}; & \text{if } x_3 < 10 \\ \frac{(x_1 x_4)^{1/8}}{(\log_2(x_2))^{1/4}(10 x_3)^{1/8}}; & \text{otherwise.} \end{cases}$$

wherein $\alpha_i(i=1,2)$ are two constants, and may, in one example, be determined as 3/64 and 1/32, respectively. The values of $\alpha_i(i=1,2)$ may be determined as other suitable values in other embodiments. $\Delta t_\alpha^M$ is the maximal value of all exposure times. $\Delta t_{i,j}^M$ and $\Delta t_{i,j}^m$ are the maximal and minimal values of two exposure times $\Delta t_i$ and $\Delta t_j$, respectively. $\upsilon$ representing a film speed for capturing the sequence of images, and may also be referred to as an ISO value. $\overline{EV}$ is the average exposure value of all LDR images and is defined as $\log_2(100\omega^2/(\upsilon\Delta\bar{t}))$, wherein $\upsilon$, $\omega$ and $\Delta\bar{t}$ are the ISO value, the aperture value and the geometrical mean value of all exposure times, respectively.

According to above embodiment, the component $$\left(\alpha_1 + \max_{1\le l\le 3}\{\varepsilon(\bar{Z}_{k,l}(p)), \varepsilon(\bar{Z}_{k',l}(p))\}\right)$$

forms the basis of the adaptive threshold in equation (9), while the component $$h\left(\frac{\Delta t_a^M}{\Delta t_{k,k'}^M}, \frac{\Delta t_{k,k'}^M}{\Delta t_{k,k'}^m}, \overline{EV}\right),$$

v) is provided to refine the adaptive threshold. There are two parts in the definition of $\xi_{k,k'}(p)$ in equation (9). The former one, $$\alpha_1 h\left(\frac{\Delta t_a^M}{\Delta t_{k,k'}^m}, \frac{\Delta t_{k,k'}^M}{\Delta t_{k,k'}^m}\right),$$

$\overline{EV}$, v), is to address the variation of image intensity values due to the sensor noise. The latter one, $$\max_{1 \le l \le 3}\{\varepsilon(\overline{Z}_{k,l}(p)), \varepsilon(\overline{Z}_{k',l}(p))\} h\left(\frac{\Delta t_a^M}{\Delta t_{k,k'}^m}, \frac{\Delta t_{k,k'}^M}{\Delta t_{k,k'}^M}\right),$$

$\overline{EV}$, v), is for the variation of image intensity values caused by the electronic noise.

The threshold may be determined for each color component in accordance with the above embodiments. The threshold for each color component may be used to compare with the similarity index determined for the respective color component. The threshold may also be determined at the pixel level in accordance with the above embodiments. The threshold at the pixel level may be used to compare with the similarity index determined for the pixel.

Based on the similarity index determined at 210 and the threshold determined at 220, one or more moving object regions may be determined at 230. The one or more moving object regions include pixels which are determined to be invalid according to various embodiments.

A pixel in the image $Z_k(k \ne k_0)$ may be marked as valid if it is similar to the co-located pixel in the reference image $Z_{k'}$, i.e. if the similarity index $S(Z_k(p), Z_{k'}(p))$ is larger than the determined threshold. The set of valid pixels in image $Z_k$ may be denoted as $C_k$, which may be determined by using the intra pixel criterion: a pixel $Z_k(p)$ is in the set $C_k$ if the similarity between pixels $Z_k(p)$ and $Z_{k'}(p)$ is high. Otherwise, it belongs to a set $\overline{C}_k$ including invalid pixels in image $Z_k$. $C_k$ may be represented by $$C_k = \{p | S(Z_k(p), Z_{k'}(p)) > \text{Thr}_{k,k'}(p)\} \quad (10)$$

Here, $C_{k_0}$ is composed of all pixels in image $Z_{k_0}$ and $$Z_{(k_0+1)'}(p) = Z_{(k_0-1)'}(p) = Z_{k_0}(p) \quad (11)$$

The comparison of the similarity index and the threshold in accordance with equation (10) may be performed at the pixel level or may be performed for each color component. For example, in an embodiment wherein a threshold is determined for each color component $Z_{k,l}(p)$ of the pixel $Z_k(p)$, the pixel $Z_k(p)$ is determined to be out of the moving object regions if the similarities between all color components of the pixel and those of its co-located pixel in the second image are higher than the respective threshold.

The above detection results may be further used to initialize a weighting matrix $\omega_k$, wherein the value of $\omega_k(p)$ is 1 if $Z_k(p)$ is valid and is 0 otherwise. To reduce the effects of noise, the value of $\omega_k(p)$ may be filtered over a window of 3×3.

The signal-to-noise ratio (SNR) of image $Z_k$ may be represented by $$SNR_k(p) = \Psi\left(\frac{E^2(p)\Delta t_k^2}{E(p)\Delta t_k + \sigma_{read}^2(p) + \kappa \sigma_{ADC}^2(p)}\right), \quad (12)$$

wherein $\kappa$ is the sensor gain, $\sigma_{read}(p)$ is the noise from sensor readout, $\sigma_{ADC}(p)$ is the combined effect of analog-to-digital conversion (ADC) including amplifier noise and quantization, and $\Psi(\,)$ is an unknown monotonic increasing function. It can be observed from equation (12) that $\sigma_{read}(p)$ and $\sigma_{ADC}(p)$ are dominant for a dark pixel p and $E(p)\Delta t_k$ is dominant for a bright one.

After determining one or more moving object regions in image $Z_k$ at 230, the image $Z_k$ are updated at 240 to correct the invalid pixels within these regions.

As described above, if $k = k_0$, the image $Z_k$ is the initial reference image and does not need to be updated. When $k \ne k_0$, the invalid pixel in the image $Z_k$ may be updated to be a corresponding intensity value in the image $Z_k$. The corresponding intensity value in the image $Z_k$ corresponds to an intensity value of the co-located pixel in the reference image $Z_{k'}$, and is determined based on an intensity mapping function from the reference image $Z_{k'}$ to the image $Z_k$.

In an embodiment, the pixels of the image $Z_k$ may be updated in accordance with the following equation:

$$Z_k(p)_{update} = \begin{cases} \vec{Z}_k(p); & \text{if } p \in \overline{C}_k \\ Z_k(p); & \text{otherwise} \end{cases} \quad (13)$$

From the above equation (13), it is seen that the value of valid pixels are maintained, while the value of invalid pixels are modified.

The value of $\vec{Z}_k(p)$ for filling in the valid regions may be determined based on the inter position criterion: Suppose $Z_k(p)$ and $Z_k(p')$ are similar to $Z_{k'}(p)$ and $Z_{k'}(p')$ respectively, for two pixels p and p' at two positions. Then, $$Z_{k',l}(p) = Z_{k',l}(p') \Rightarrow Z_{k,l}(p) = Z_{k,l}(p')$$

if there is neither sensor noise nor electronic noise with both pairs of pixels.

For a pixel $p \in \overline{C}_k$, suppose that there exists another pixel p' $\in C_k$ such that $Z_{k',l}(p')$ and $Z_{k',l}(p)$ are equal. According to the above inter pixel criterion, $\vec{Z}_{k,l}(p)$ may be updated as $Z_{k,l}(p')$. In a situation having both sensor noise and electronic noise associated with both pairs of pixels, it is desired to reduce the effects of both types of noises.

According to an embodiment, an IMF based method may be provided to reduce the effect of the sensor noise. It is noted that there may exist a plurality of pixels in the region $\overline{C}_k$ that satisfy the above condition. The number of such pixels is denoted as $\xi_{k,l}(p)$. The updated value $\vec{Z}_k(p)$ may be determined in accordance with the following equation:

$$\vec{Z}_k(p) = \Lambda_{k',k}(Z_{k'}(p)) \quad (14)$$

Accordingly, an updated pixel $\vec{Z}_k(p) = [\vec{Z}_{k,1}(p), \vec{Z}_{k,2}(p), \vec{Z}_{k,3}(p)]^T$ is synthesized by using $Z_{k'}(p)$ and $\Lambda_{k',k}(z)$ in accordance with the equation (14).

The variances of noises can be reduced by factors of $1/\sqrt{\xi_{k,l}(p)}$ (l=1,2,3) in accordance with the embodiments above.

In another embodiment, the effect of electronic noise may be reduced by applying an average filter to $\vec{Z}_k(p)$ using a plurality of neighboring pixels, wherein the plurality of neighboring pixels have been updated in accordance with equations (13) and (14) above. The average filter may be referred to as a spatial average filter, wherein $\vec{Z}_k(p)$ determined according to equation (14) may be further filtered by a weighted filter as $$\vec{Z}_k(p) = \frac{\vec{Z}_k(p)}{2} + \sum_{i=1}^{4} \frac{Z_{k'}(p_i)}{8} \quad (15)$$

wherein $p_i(1 \le i \le 4)$ are four neighboring pixels of p in the reference image $Z_{k'}$ that having been scanned and updated before the pixel p.

In another embodiment, the updated value $\vec{Z}_k(p)$ may be reconstructed using pixels from the next image to be processed and the IMFs from the next image to be processed to the current image being processed, wherein the reference image $Z_{k'}$ of the current image $Z_k$ is used as the reference image to check whether the co-located pixel in the next image to be processed and $Z_{k'}(p)$ are similar. If they are similar, the updated value $\vec{Z}_k(p)$ can be constructed by mapping the co-located pixel from the next image to be processed to the current image $Z_k$, based on an intensity mapping function from the next image to be processed to the current image $Z_k$ similar to the embodiments above. This is a bi-directional reconstruction method.

According to the above embodiments, the image $Z_k$ is updated at 240 by updating the values of each pixel classified to be invalid pixel, and accordingly the moving object is removed from the updated image $Z_{k\ update}$. A sequence of updated LDR images 130 is output from the image updater 240, and is used for synthesis of an HDR image 160 according to FIG. 1.

In the above embodiments of updating the pixels of invalid regions, the spatial correlation among pixels in images $Z_k$ and $Z_{k'}$ is utilized. Different from the existing method wherein all invalid regions are filled in by pixels from a single selected image such that dynamic ranges of moving objects may be reduced, the above embodiments fill in invalid regions using pixel information from all LDR images. Since moving objects belong to invalid regions, the above embodiments may be applied to preserve the dynamic ranges of moving objects better when the inherent ranges of the moving objects are high. In addition, the above embodiments for image updating is fast in the sense that all pixels in image $Z_k$ are only scanned once in the raster scan order.

According to the various embodiments described with regard to FIG. 2 above, an intensity based similarity index is provided by using the intensity mapping functions (IMFs) between two differently exposed images being compared. There are possibly large intensity changes between two co-located pixels due to different exposures and variation among pixels in an image caused by sensor and electronic noises. The IMFs between these two images are adopted to unify the intensities of co-located pixels in the two images and to reduce the effect of sensor noise. Meanwhile, a bi-directional mapping method is provided to reduce the effect of electronic noise. As a result, the similarity index determined in accordance with the embodiments is robust with respect to different exposures between the two images and the sensor and electronics noises in the two images.

The similarity index is applied to detect moving objects in a set of differently exposed LDR images. A pixel in an image is valid if the similarity between its reference pixel and itself is larger than a threshold, and is invalid otherwise. The threshold is adaptive to at least one of the intensity values of two pixels, the exposure times of two images, the ISO value for capturing the images and the average exposure value of all LDR images. This adaptive threshold of various embodiments is able to improve the robustness of the moving object detection scheme with respect to the sense and electronics noises. Since the correlation between two successive images is usually the strongest, after checking all pixels in the current image, the current image is updated and used as the reference image for the subsequent image. All valid pixels are adopted to update the current image.

An IMF based approach, together with a spatial average filter, is provided to synthesize pixels for the patching of invalid regions. The movement detection of the embodiments is robust with respect to different exposures of input images as well as the sensor and electronic noises in the input images. Moreover, a method is also provided to fill in invalid regions by using the spatial correlation among pixels in the current and reference images. All input images can be used to patch the invalid regions, instead of using only one input image as in existing methods. Therefore, the dynamic range of the final HDR image may be preserved better according to various embodiments.

The image processing method described in various embodiments above may be carried out by an image processing device.

Figure 4:
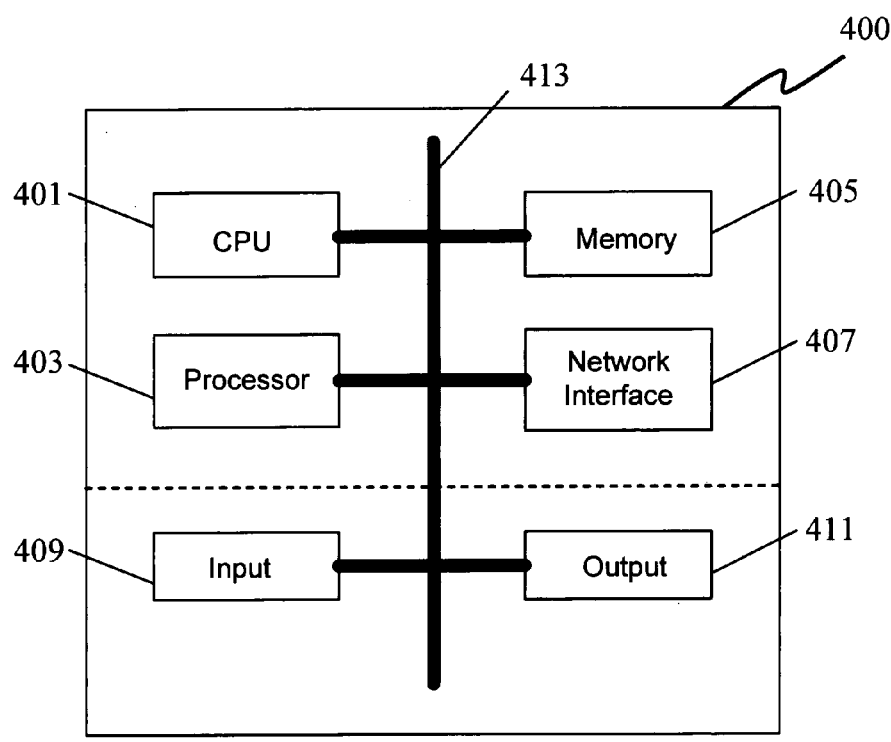
FIG. 4 shows a schematic diagram of an image processing device according to various embodiments.

FIG. 4 shows a schematic diagram of an image processing device according to various embodiments.

The image processing device 400 may be implemented by a computer system. In various embodiments, the decider, the similarity determiner, the threshold determiner, the moving object region determiner, the corresponding intensity value determiner and the updater may also be implemented as modules executing on one or more computer systems. The computer system may include a CPU 401 (central processing unit), a processor 403, a memory 405, a network interface 407, input interface/devices 409 and output interface/devices 411. All the components 401, 403, 405, 407, 409, 411 of the computer system 400 are connected and communicating with each other through a computer bus 413.

The memory 405 may be used as for storing images, similarity indexes, thresholds, pixels belonging to moving object regions, and updated images used and determined according to the method of the embodiments. The memory 405 may include more than one memory, such as RAM, ROM, EPROM, hard disk, etc. wherein some of the memories are used for storing data and programs and other memories are used as working memories.

In an embodiment, the memory 405 may be configured to store instructions for processing an image according to various embodiments above. The instructions, when executed by the CPU 401, may cause the CPU 401 to determine a similarity index, determine a threshold, determine a moving object region, determine a corresponding intensity value, and determine an updated intensity value. The instruction may also cause the CPU 401 to store similarity indexes, thresholds, pixels belonging to moving object regions, and updated images determined according to the method of the embodiments in the memory 405.

In another embodiment, the processor 403 may be a special purpose processor, in this example, a image processor, for executing the instructions described above.

The CPU 401 or the processor 403 may be used as the image processing device as described in various embodiments below, and may be connected to an internal network (e.g. a local area network (LAN) or a wide area network (WAN) within an organization) and/or an external network (e.g. the Internet) through the network interface 407.

The Input 409 may include a keyboard, a mouse, etc. The output 411 may include a display for display the images processed in the embodiments below.

The embodiments above may be combined with the method in "P. Debevec and J. Malik, Recovering high dynamic range radiance maps from photograph, In *Proceedings SIGGRAPH* 1997, pp. 369-378, 1997" for the synthesis of HDR images. The updated LDR images may be provided as the inputs of the method in "P. Debevec and J. Malik", to produce an HDR image without any ghosting artifact.

In the following, the updated reference images are represented by $\hat{Z}_k(1 \leq k \leq n_0)$, and are used as the inputs of the method in "P. Debevec and J. Malik". The value of E(p) is computed by $$\log(E(p)) = \frac{\sum_k w(\hat{Z}_k(p))(\log(f^{-1}(\hat{Z}_k(p))) - \log(\Delta t_{k'}))}{\sum_k w(\hat{Z}_k(p))}. \quad (16)$$

Sufficient condition and necessary condition on the acceptable quality of the final HDR image may be derived by using all sets $C_k$'s as follows:

Proposition 1: The final synthesized HDR image is acceptable at pixel p if there exists a pixel $Z_k(p)$ in the set $C_k$ such that the following two Wyckoff signal/noise criteria (17) and (18) are satisfied for all color channel l.

$$f_l^{-1}(Z_{k,l}(p)) \gg \eta_{q,k,l}(p), \quad (17)$$

$$\omega(Z_{k,l}(p)) \gg \omega(\eta_{f,k,l}(p)). \quad (18)$$

Proof: From equation (16), the value of $E_l(p)$ may be computed by $$\log(E_l(p)) = \frac{\sum_{k,p \in C_{k'}} w(Z_{k',l}(p))(\log(f_l^{-1}(Z_{k',l}(p))) - \log(\Delta t_{k'}))}{\sum_{k',p \in C_{k'}} w(Z_{k',l}(p)) + \sum_{k,p \in C_{T(k)}} w(\vec{Z}_{k',l}(p))} +$$

$$\frac{\sum_{k,p \in \bar{C}_{k'}} w(\vec{Z}_{k',l}(p))(\log(f_l^{-1}(\vec{Z}_{k',l}(p))) - \log(\Delta t_{k'}))}{\sum_{k,p \in C_{k'}} w(Z_{k',l}(p)) + \sum_{k,p \in \bar{C}_{k'}} w(\vec{Z}_{k',l}(p))}.$$

It is shown from the inequalities (17) and (18) and the above equation that the final synthesized HDR image is acceptable at pixel p.

Proposition 2: The final synthesized HDR image is not acceptable at pixel p if all $Z_k(p)$'s ($k \neq k_0$) are invalid and there exists a color channel l such that $Z_{k_0,l}(p)$ does not satisfy the inequalities (17) and (18).

Proof: Similar to the proof of Proposition 1, it is determined that $$\log(E_l(p)) = \frac{w(Z_{k_0,l}(p))(\log(f_l^{-1}(Z_{k_0,l}(p))) - \log(\Delta t_{k_0}))}{w(Z_{k_0,l}(p)) + \sum_{k \neq k_0} w(\vec{Z}_k(p))} +$$

$$\frac{\sum_{k \neq k_0} w(\vec{Z}_k(p))(\log(f_l^{-1}(\vec{Z}_k(p))) - \log(\Delta t_k))}{w(Z_{k_0,l}(p)) + \sum_{k \neq k_0} w(\vec{Z}_k(p))}.$$

Since $Z_{k_0,l}(p)$ does not satisfy the inequalities (17) and (18), the values of all $\vec{Z}_k(p)$ ($k \neq k_0$) are not reliable. Therefore, the final synthesized HDR image is not acceptable at pixel p.

According to the above embodiments, the moving object detection is independent of CRFs (camera response functions), and is thus robust with respect to the estimation error of CRFs. As shown in FIG. 1, The CRFs are estimated at 140 after the moving object is detected and removed from the LDR images 110. Accordingly, pixels with high similarity among the differently exposed LDR images are used to estimate the CRFs. Therefore, the estimated CRFs at 140 is more accurate.

In other embodiments, the various embodiments may be used to generate an HDR video. All images between two shot boundaries may be put together to form a group, and each image in the group may be selected as the initial reference image to generate the corresponding HDR image. Subsequently, an HDR video sequence is generated.

Experimental results are described in the following section. The image processing method according to various embodiments above is verified by using it to synthesize HDR images. The synthesized HDR images usually cannot be displayed directly by existing digital displaying system. To this end, tone mapping schemes were designed for the visualization of HDR images.

Figure 6:
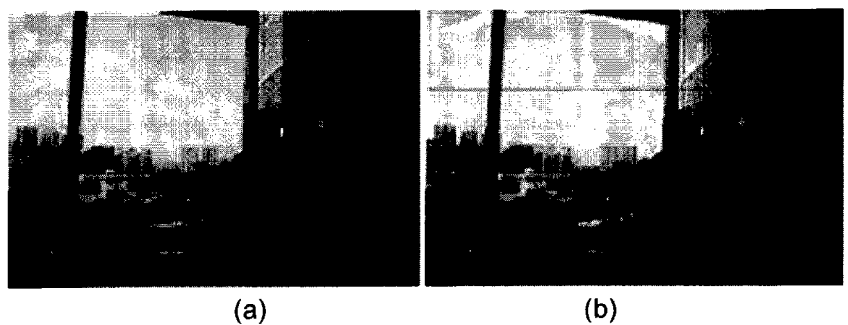
FIG. 6 shows experimental results of a bi-directional similarity detection method of an embodiment and a uni-directional similarity detection method carried out on the image sequence of FIG. 5.

First, the method for similarity determination based on bi-directional mapping method is compared with the similarity determination based on the conventional uni-directional method. The testing sequence is composed of five images with movement in head and body of a girl as shown in FIG. 5, and the experimental results are shown in FIG. 6. FIG. 6(*a*) shows a HDR image synthesized using the bi-directional mapping method of the various embodiments, and FIG. 6(*b*) shows a HDR image synthesized using the uni-directional method. It can be seen from FIG. 6 that the bi-directional method can be used to improve the quality of bright parts in the synthesized HDR image.

Figure 8:
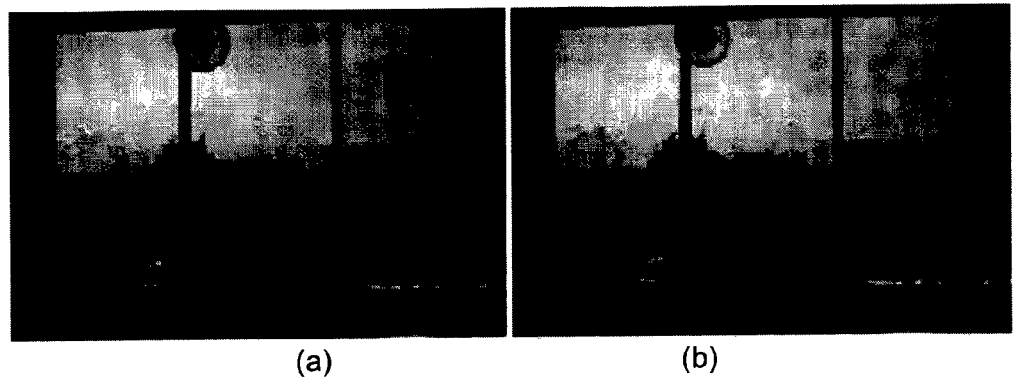
FIG. 8 shows experimental results of using an adaptive threshold according to an embodiment and using a fixed threshold for movement detection.

The efficiency of the adaptive threshold according to various embodiments is evaluated by comparing with the situation in which the threshold is fixed as ¼. The testing sequence consists of seven images with movement in head and body of a man as illustrated in FIG. 7, and the experimental results are shown in FIG. 8. FIG. 8(*a*) shows the resulting image using the adaptive threshold of the embodiments, and FIG. 8(*b*) shows the resulting image using the fixed threshold of ¼. From FIG. 8, it is illustrated that using the adaptive threshold of the embodiments can remove ghosting artifacts in the area corresponding to the neck of the man, whereas using the fixed threshold cannot remove the ghosting artifacts in this area.

Figure 9:
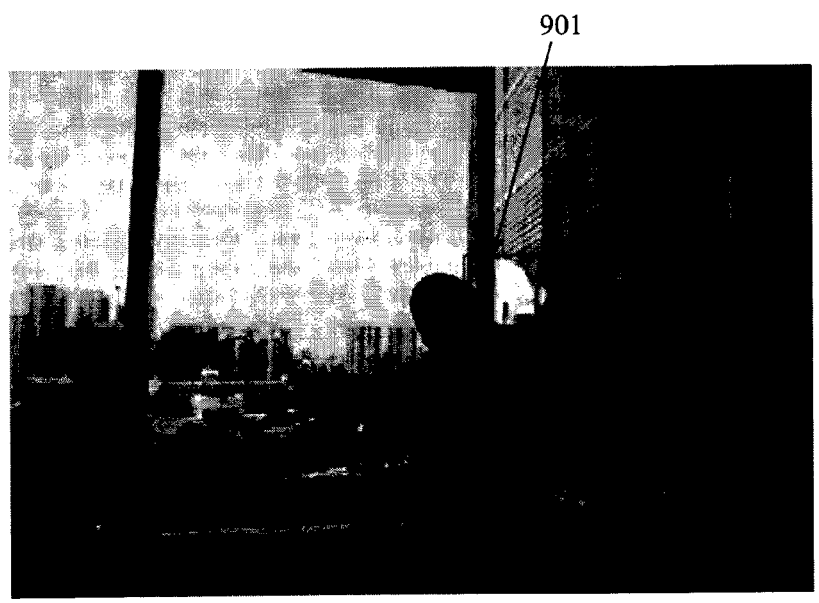
FIG. 9 shows experimental result of an synthesized HDR image based on the image sequence of FIG. 5.

Proposition 2 above may be verified by testing the LDR image sequence in FIG. 5. An example of the verification is shown in FIG. 9. The basis image is selected as the first one. It is shown in FIG. 9 that the area in a box 901 in the synthesized HDR image is not acceptable.

The various embodiments described with regard to FIGS. 1 and 2 may also be applied to produce a HDR video. All images between two shot boundaries are put together to form a group. Each image in the group is selected as the initial reference image to generate the corresponding HDR image.

Figure 10:
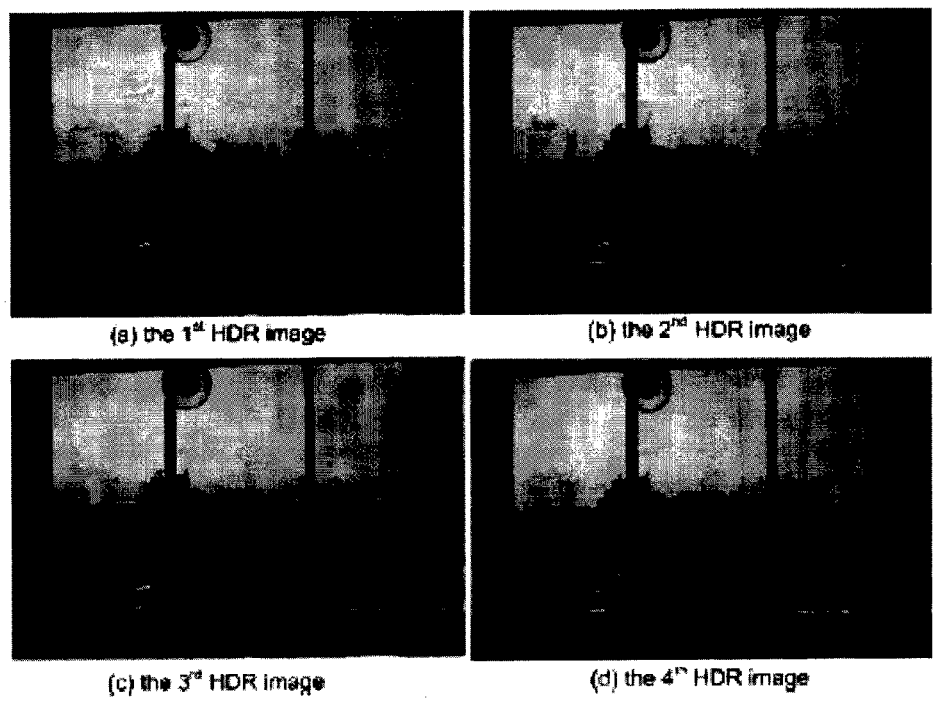
FIG. 10 shows an HDR video generated by the method of an embodiment.

Subsequently, an HDR video sequence is generated. Four of the HDR images synthesized based on the testing sequence of FIG. 7 are shown in FIG. 10.

The method of various embodiments is also compared with existing methods. The method of the embodiments is firstly compared with the schemes in "T. Grosch, Fast and robust high dynamic range image generation with camera and object movement, In *Vision, Modeling and Visualization*, pp. 277-284, 2006" and "K. Jacobs, C. Loscos, and G. Ward, Automatic high dynamic range image generation for dynamic scenes", *IEEE Computer Graphics and Applications*, Vol. 128, No. 2, pp. 84-93, 2008", by considering a numerical example with three input LDR images $\{Z_1, Z_2, Z_3\}$. $Z_2$ is selected as the initial reference image in the proposed scheme. Suppose that there are two clusters of pixels $\{Z_1(p_1), Z_2(p_1), Z_3(p_1)\}$ $\{Z_1(p_2), Z_2(p_2), Z_3(p_2)\}$ that are affected by movement in "T. Grosch" and "K. Jacobs". The values of $E_2(p_1)$ and $E_3(p_1)$ are the same while the values of $E_1(p_1)$ and $E_2(p_1)$ are different. The value of $E_1(p_2)$ and $E_2(p_2)$ are the same while the values of $E_2(p_2)$ and $E_3(p_2)$ are different. With the method of the embodiments, $Z_2(p_1)$ and $Z_3(p_1)$ are marked as valid and $Z_1(p_1)$ is marked as invalid. A new pixel, $\vec{Z}_1(p_1)$, is reconstructed by using the correlation between images $Z_1$ and $Z_2$ and used to replace $Z_1(p_1)$. Similarly, $Z_2(p_2)$ and $Z_1(p_2)$ are marked as valid and $Z_3(p_2)$ is marked as invalid. A new pixel, $\vec{Z}_3(p_2)$, is reconstructed to replace $Z_3(p_2)$. By using the methods in "T. Grosch" and "K. Jacobs", both clusters of pixels are marked as moving clusters and all pixels in a cluster are replaced by one of pixels in the cluster. It is seen that the dynamic range of the final HDR image is preserved better by using the method of the embodiments, compared with the schemes in "T. Grosch" and "K. Jacobs".

Figure 11:
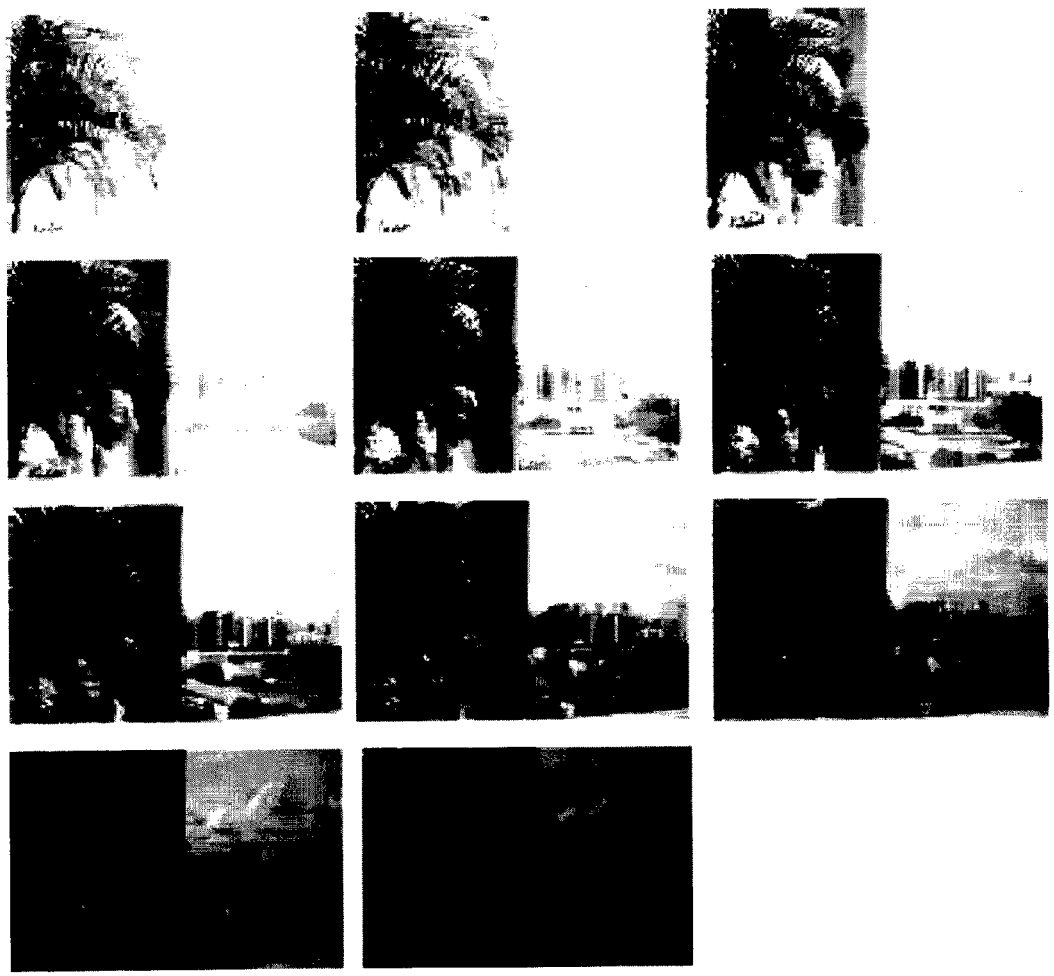
FIG. 11 shows a LDR image sequence with eleven different exposure time.
Figure 12:
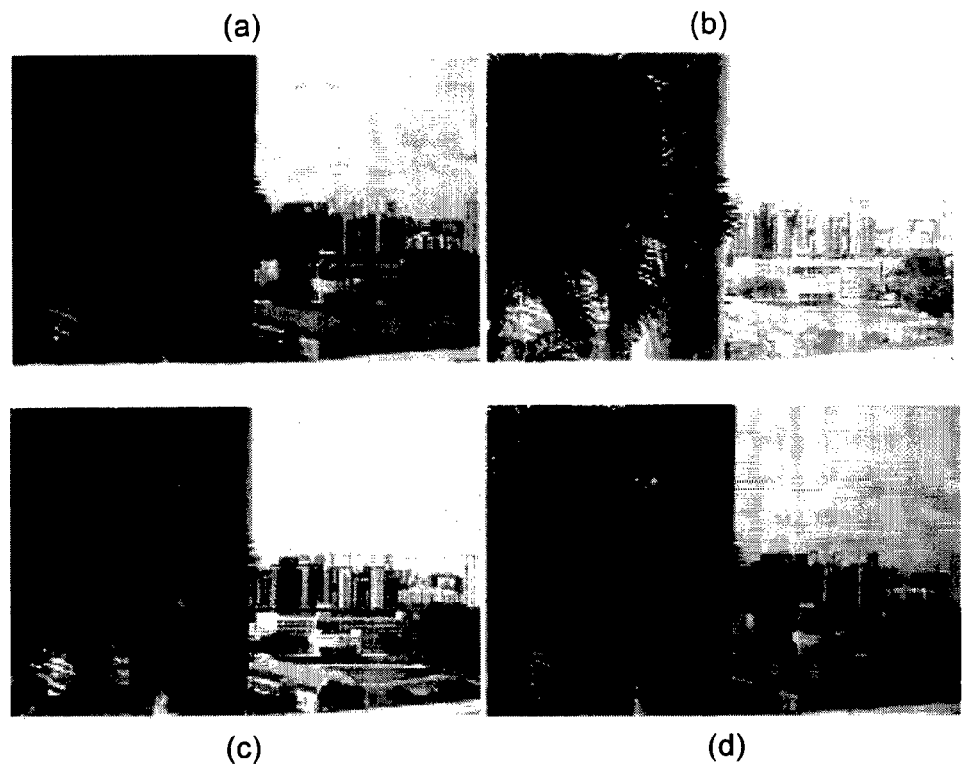
FIG. 12 shows experimental results of different methods for ghosting artifacts removal.

The method of various embodiments is also compared with three commercial software FDRTools (htto://fdrtools.com/front_e.php), Photomatix (http://www.hdrsoft.com/) and Qtpfsgui (http://qtpfsgui.sourceforge.net/). The testing sequence is composed of 11 images with waiving leafs as demonstrated in FIG. 11. FIG. 12(a), (b), (c), (d) show the results of FDRTools, Photomatix, Qtpfsgui and the method of the embodiments, respectively. It is shown in the results in FIG. 12 that 1) ghosting artifacts, due to waving leafs, are not removed by using these commercial softwares, especially by Qtpfsgui; 2) the ghosting artifacts are removed via the method of the embodiments.

Figure 13:
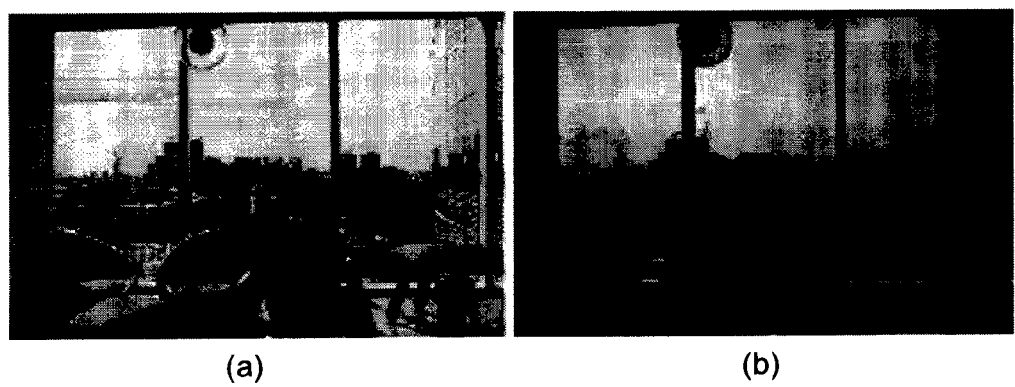
FIG. 13 shows HDR images generated by PHOTOMATIX and a method of an embodiment.

The method of the embodiments and Photomatix are further compared by testing the image sequence in FIG. 7. FIG. 13(a) shows the HDR image generated using Photomatix, and FIG. 13(b) shows the HDR image generated using the method of the embodiments. It is shown in FIG. 13 that the quality of the human subject is poor and his black cloth is not smooth by using the Photomatix, while the quality of the human subject is high by using the method of the embodiments.

According to the method of various embodiments, ghosting artifacts are removed from the final HDR image even though there are moving objects in a scene.

The movement detection according to various embodiments may be speed up via a sub-sampling method. In other words, instead of detecting moving objects in the original input images, the input images are first sampled by half at both horizontal and vertical directions. Moving objects are then detected on the sub-sampled images. Additional detection is conducted on the original input images if necessary. The movement detection of various embodiments may be used in various applications. For example, the movement detection of various embodiments, together with image inpainting, can be used to produce HDR videos without any reduction of frame rate.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method for processing a first image based on a second image, each pixel in the first image having a plurality of color components and having a corresponding pixel in the second image, wherein each value of a color component in the first image corresponds to a value of a color component in the second image, the method comprising:
    deciding, for each color component of a pixel in the first image, whether to modify the value of the color component dependent on a predetermined criterion; and
    determining a similarity index between the pixel in the first image and the corresponding pixel in the second image based on, for each color component of the pixel, the value of the color component of the pixel, or if it is decided that the value of the color component of the pixel is to be modified, the corresponding value of the color component in the second image,
    wherein deciding whether to modify the value of the color component is dependent on a comparison of an exposure level of the color component of the pixel in the first image with an exposure level of the color component of the corresponding pixel in the second image, and
    wherein the exposure level of the color component of the pixel in the first image represents a deviation of the value of the color component of the pixel from a predetermined value, and the exposure level of the color component of the corresponding pixel in the second image represents a deviation of the value of the color component of the corresponding pixel from the predetermined value, wherein the predetermined value is a middle value of a value range of the first image and the second image.

2. The method of claim 1, wherein each pixel in the first image and its corresponding pixel in the second image are co-located.

3. The method of claim 1, wherein the plurality of color components comprises a red color component, a green color component, and a blue color component.

4. The method of claim 1, further comprising
    deciding, for each color component of the corresponding pixel in the second image, whether to modify the value of the color component of the corresponding pixel dependent on a predetermined criterion, wherein each value of a color component in the second image corresponds to a value of a color component in the first image; and
    determining the similarity index between the pixel in the first image and the corresponding pixel in the second image based on, for each color component of the corresponding pixel, the value of the color component of the corresponding pixel, or if it is decided that the value of the color component of the corresponding pixel is to be modified, the corresponding value of the color component in the first image.

5. The method of claim 1, wherein the corresponding value of a color component in the second image is determined to correspond to the value of a color component in the first image based on an intensity mapping function from the first image to the second image, wherein the intensity mapping function is determined based on accumulated histograms of the first image and the second image.

6. The method of claim 1, further comprising
determining the pixel of the first image to be within or out of a moving object region dependent on the determined similarity index.

7. A method for processing a first image based on a second image, the first image and the second image being part of a sequence of images captured with different exposure time, the method comprising:
 determining a similarity index between a pixel of the first image and a corresponding pixel of the second image, the similarity index representing a degree of similarity between the pixel and the corresponding pixel;
 determining a threshold for the pixel dependent on at least one of exposure time of the first image, exposure time of the second image, a film speed for capturing the sequence of images, and an average exposure value of the sequence of images; and
 determining the pixel to be within or out of a moving object region dependent on a comparison of the determined similarity index with the determined threshold,
 wherein said determining a threshold for the pixel further comprises determining the threshold for the pixel dependent on an intensity value of the pixel in the first image and an intensity value of the corresponding pixel in the second image.

8. The method of claim 7, wherein said determining the threshold for the pixel dependent on an intensity value of the pixel in the first image and an intensity value of the corresponding pixel in the second image comprises determining the threshold for the pixel dependent on an exposure level of the pixel in the first image and an exposure level of the corresponding pixel in the second image.

9. The method of claim 8, wherein the exposure level of the pixel in the first image represents a deviation of the intensity value of the pixel from a predetermined value, and the exposure level of the corresponding pixel in the second image represents a deviation of the intensity value of the corresponding pixel from the predetermined value, wherein the predetermined value is a middle value of an intensity value range of the first image and the second image.

10. The method of claim 7, wherein determining the similarity index between the pixel of the first image and the corresponding pixel of the second image comprises:
 deciding, for each color component of the pixel in the first image, whether to modify the value of the color component dependent on a predetermined criterion, wherein each value of a color component in the first image corresponds to a value of a color component in the second image; and
 determining the similarity index between the pixel in the first image and the corresponding pixel in the second image based on, for each color component of the pixel, the value of the color component of the pixel, or if it is decided that the value of the color component of the pixel is to be modified, the corresponding value of the color component in the second image.

11. A method for processing a first image based on a second image, the first image and the second image being part of a sequence of images captured with different exposure time, the method comprising:
 determining a similarity index between a pixel of the first image and a corresponding pixel of the second image, the similarity index representing a degree of similarity between the pixel and the corresponding pixel;
 determining a threshold for the pixel;
 determining the pixel to be within or out of a moving object region dependent on a comparison of the determined similarity index with the determined threshold;
 if the pixel is determined to be within the moving object region, determining a corresponding intensity value in the first image corresponding to an intensity value of the corresponding pixel in the second image or in a third image of the sequence of images based on an intensity mapping function from the second image or the third image to the first image, wherein the intensity mapping function is determined based on accumulated histograms of the first image and the second or the third image;
 if the pixel is determined to be within the moving object region, determining whether the corresponding pixel of the second image and the corresponding pixel of the third image is similar;
  if the corresponding pixel of the second image is not similar to the corresponding pixel of the third image, determining the corresponding intensity value in the first image based on an intensity mapping function from the second image to the first image;
  if the corresponding pixel of the second image is similar to the corresponding pixel of the third image, determining the corresponding intensity value in the first image based on an intensity mapping function from the third image to the first image; and
 determining an updated intensity value of the pixel in the first image to be the determined corresponding intensity value in the first image.

12. The method of claim 11, wherein the corresponding intensity value in the first image and the updated intensity value of the pixel in the first image are determined for each color component of a plurality of color components of the pixel separately.

13. The method of claim 11, wherein the intensity mapping functions comprise minimizing a difference between the accumulated histogram of the first image and the accumulated histogram of the second image or the third image, wherein the accumulated histogram of the first image represents a number of pixels in the first image having an intensity value equal to or less than the corresponding intensity value in the first image to be determined, the accumulated histogram of the second image represents a number of pixels in the second image having an intensity value equal to or less than the intensity value of the corresponding pixel in the second image, and the accumulated histogram of the third image represents a number of pixels in the third image having an intensity value equal to or less than the intensity value of the corresponding pixel in the third image.

14. The method of claim 11, further comprising
applying an average filter to the determined corresponding intensity value using a plurality of neighboring pixels, wherein intensity values of the plurality of neighboring pixels have been processed according to claim 11.

15. The method of claim 11, wherein if the pixel is determined to be out of the moving object region, the updated intensity value of the pixel is determined to be the intensity value of the pixel.

* * * * *